US009459721B2

(12) United States Patent
Tan et al.

(10) Patent No.: US 9,459,721 B2
(45) Date of Patent: Oct. 4, 2016

(54) ACTIVE MATRIX ORGANIC LIGHT EMITTING DIODE PIXEL UNIT CIRCUIT, DISPLAY PANEL AND ELECTRONIC PRODUCT

(71) Applicants: CHENGDU BOE OPTOELECTRONICS TECHNOLOGY CO., LTD., Chengdu, Sichuan Province (CN); BOE TECHNOLOGY GROUP CO., LTD., Beijing (CN)

(72) Inventors: Wen Tan, Beijing (CN); Xiaojing Qi, Beijing (CN); Bo Wu, Beijing (CN)

(73) Assignees: CHENGDU BOE OPTOELECTRONICS TECHNOLOGY CO., LTD. (CN); BOE TECHNOLOGY GROUP CO., LTD. (CN)

( * ) Notice: Subject to any disclaimer, the term of this patent is extended or adjusted under 35 U.S.C. 154(b) by 36 days.

(21) Appl. No.: 14/234,773

(22) PCT Filed: Sep. 24, 2013

(86) PCT No.: PCT/CN2013/084057
§ 371 (c)(1),
(2) Date: Jan. 24, 2014

(87) PCT Pub. No.: WO2014/205932
PCT Pub. Date: Dec. 31, 2014

(65) Prior Publication Data
US 2015/0002414 A1    Jan. 1, 2015

(30) Foreign Application Priority Data

Jun. 26, 2013  (CN) .......................... 2013 1 0260045

(51) Int. Cl.
*G06F 3/041*        (2006.01)
*G06F 3/042*        (2006.01)
(Continued)

(52) U.S. Cl.
CPC ............. *G06F 3/0412* (2013.01); *G06F 3/044* (2013.01)

(58) Field of Classification Search
CPC ........ G06F 3/041; G06F 3/042; G06F 3/044; G06F 3/038; G09G 3/30; G09G 3/32; G09G 3/3208; G09G 3/3225; G09G 3/3618; G09G 5/00; G09G 5/10; H01L 27/32; H01L 51/10; H01L 51/52; H01L 51/56; H01L 21/00; H01L 33/16; H01L 29/04; H04N 3/14
See application file for complete search history.

(56) References Cited

U.S. PATENT DOCUMENTS 8,237,634 B2    8/2012  Kwak
8,446,390 B2    5/2013  Hattori
(Continued)

FOREIGN PATENT DOCUMENTS

CN        1669067 A       9/2005
CN      101576676 A      11/2009
(Continued)

OTHER PUBLICATIONS

Chinese Office Action Dated Nov. 24, 2014, Application No. 201310260045.8, Applicant Chengdu Boe Optoelectronics Technology Co., Ltd., Boe Technology Group Co., Ltd., 6 Pages.
(Continued)

*Primary Examiner* — Ilana Spar
*Assistant Examiner* — Nguyen H Truong
(74) *Attorney, Agent, or Firm* — Brooks Kushman P.C.

(57) ABSTRACT

Disclosed are an AMOLED pixel unit circuit, a display panel and an electronic product, to integrate a TSP in Cell circuit into the AMOLED pixel unit circuit, and to manufacture the AMOLED display panel having a touch screen function and the electronic product having the display panel. The AMOLED pixel unit circuit comprises a driving module configured to amplify an induction signal generated by the touch sensing module, output the induction signal through an induction signal outputting module, and drive a light emitting module; a light emission controlling module configured to control the light emitting module to emit light; a threshold compensating module configured to compensate a threshold voltage for the driving module; a touch sensing module configured to generate the induction signal and output the induction signal to the driving module; and the induction signal outputting module configured to output the induction signal amplified by the driving module.

10 Claims, 5 Drawing Sheets

(51) Int. Cl.
*G09G 3/30* (2006.01)
*G06F 3/044* (2006.01)

(56) References Cited

U.S. PATENT DOCUMENTS

| | | | |
|---|---|---|---|
| 8,451,251 B2 | 5/2013 | Choi et al. | |
| 8,575,530 B2 | 11/2013 | Chan et al. | |
| 9,122,339 B2 | 9/2015 | Yang | |
| 2005/0007353 A1 | 1/2005 | Smith et al. | |
| 2005/0093791 A1* | 5/2005 | Lo | 345/82 |
| 2006/0164344 A1* | 7/2006 | Fish | G09G 3/3233 345/76 |
| 2006/0214893 A1 | 9/2006 | Tseng et al. | |
| 2006/0267508 A1* | 11/2006 | Sun | G09G 3/3233 315/169.3 |
| 2007/0279337 A1 | 12/2007 | Kim et al. | |
| 2009/0153438 A1 | 6/2009 | Miller et al. | |
| 2009/0225011 A1 | 9/2009 | Choi | |
| 2009/0231308 A1 | 9/2009 | Numao | |
| 2010/0012823 A1 | 1/2010 | Ahn et al. | |
| 2010/0039406 A1 | 2/2010 | Lee et al. | |
| 2010/0097350 A1 | 4/2010 | Choi et al. | |
| 2010/0097354 A1 | 4/2010 | Ahn et al. | |
| 2010/0144391 A1 | 6/2010 | Chang et al. | |
| 2010/0220069 A1 | 9/2010 | Choi et al. | |
| 2010/0231548 A1* | 9/2010 | Mangione-Smith | G06F 3/0412 345/174 |
| 2011/0001711 A1 | 1/2011 | Choi et al. | |
| 2011/0115764 A1 | 5/2011 | Chung | |
| 2012/0038585 A1 | 2/2012 | Kim | |
| 2012/0044176 A1 | 2/2012 | Nakamura et al. | |
| 2012/0061556 A1 | 3/2012 | Chan et al. | |
| 2012/0154319 A1 | 6/2012 | Konieck | |
| 2013/0063407 A1* | 3/2013 | Usukura et al. | 345/207 |
| 2013/0088165 A1* | 4/2013 | Wang et al. | 315/240 |
| 2013/0106828 A1 | 5/2013 | Kim | |
| 2013/0127787 A1 | 5/2013 | Kim et al. | |
| 2013/0146881 A1 | 6/2013 | Yamazaki et al. | |
| 2014/0055326 A1 | 2/2014 | Lai | |
| 2014/0118231 A1 | 5/2014 | Yang et al. | |
| 2014/0168127 A1 | 6/2014 | Yang | |
| 2014/0198072 A1* | 7/2014 | Schuele | G06F 3/044 345/174 |

FOREIGN PATENT DOCUMENTS

| | | |
|---|---|---|
| CN | 101587256 A | 11/2009 |
| CN | 101587400 A | 11/2009 |
| CN | 101630481 A | 1/2010 |
| CN | 101726890 A | 6/2010 |
| CN | 101943974 A | 1/2011 |
| CN | 101944323 A | 1/2011 |
| CN | 102117596 A | 7/2011 |
| CN | 102402931 A | 4/2012 |
| CN | 102903333 A | 1/2013 |
| CN | 103135846 A | 6/2013 |
| CN | 103295525 A | 9/2013 |
| CN | 103325343 A | 9/2013 |
| CN | 103354078 A | 10/2013 |
| CN | 103354079 A | 10/2013 |
| CN | 103354080 A | 10/2013 |
| CN | 203242305 U | 10/2013 |
| CN | 203300191 U | 11/2013 |
| CN | 203300192 U | 11/2013 |
| CN | 203300193 U | 11/2013 |
| CN | 203300194 U | 11/2013 |
| JP | 2010085526 A | 4/2010 |
| KR | 20070115261 A | 12/2007 |
| KR | 20090009387 A | 1/2009 |

OTHER PUBLICATIONS

PCT Search Report and Written Opinion Dated Mar. 27, 2014, Application No. PCT/CN2013/084057, 15 pages.

Chinese Office Action Dated Nov. 3, 2014, Application No. 201310271688.2, Applicant BOE Technology Group Co., Ltd.; Chengdu Boe Optoelectronics Technology Co., Ltd., 6 Pages.

Chinese Office Action Dated Nov. 15, 2014, Application No. 201310259706.5, Applicant Chengdu BOE Dptoelectronics Technology Co., Ltd.; Boe Technology Group Co., Ltd., 6 Pages.

Chinese First Office Action Dated Dec. 3, 2014, Application No. 201310260936.3, 7 Pages.

Chinese Second Office Action Dated Feb. 28, 2015, Application No. 201310260936.3, 7 Pages.

Chinese Fourth Office Action Dated Sep. 30, 2015, Application No. 201310260936.3, 5 Pages.

PCT Written Opinion and Search Report Dated Jun. 26, 2013, Application No. PCT/CN2013/084055, 15 Pages.

PCT Written Opinion and Search Report Dated Jun. 26, 2013, Application No. PCT/CN2013/084919, 15 Pages.

PCT Written Opinion and Search Report Dated Jul. 1, 2013, Application No. PCT/CN2013/089701, 13 Pages.

* cited by examiner

ACTIVE MATRIX ORGANIC LIGHT EMITTING DIODE PIXEL UNIT CIRCUIT, DISPLAY PANEL AND ELECTRONIC PRODUCT

CROSS-REFERENCE TO RELATED APPLICATION

This application is the U.S. national phase of PCT Application No. PCT/CN2013/084057 filed on Sep. 24, 2013, which claims priority to Chinese Patent Application No. 201310260045.8 filed on Jun. 26, 2013, the disclosures of which are incorporated in their entirety by reference herein.

TECHNICAL FIELD

The present invention relates to the field of display technology, in particular to an active matrix organic light emitting diode pixel unit circuit, a display panel and an electronic product.

BACKGROUND

A TSP (Touch Screen Panel) in Cell technology is to manufacture a TSP sensor and a driving circuit thereof on an array substrate by means of an array process. Through the integration of the TSP sensor into a liquid crystal cell of a LCD (Liquid Crystal Display) panel, it is able to achieve a light and thin product, to provide diverse functions, and to effectively improve the reliability of the touch screen panel.

Figure 1A:
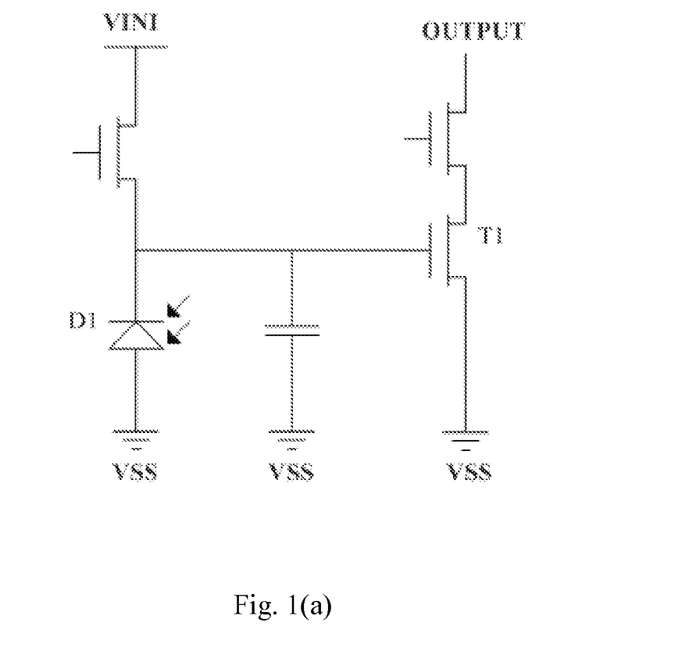
FIGS. 1(a) and 1(b) are schematic diagrams showing an existing TSP in Cell circuit.
Figure 1B:
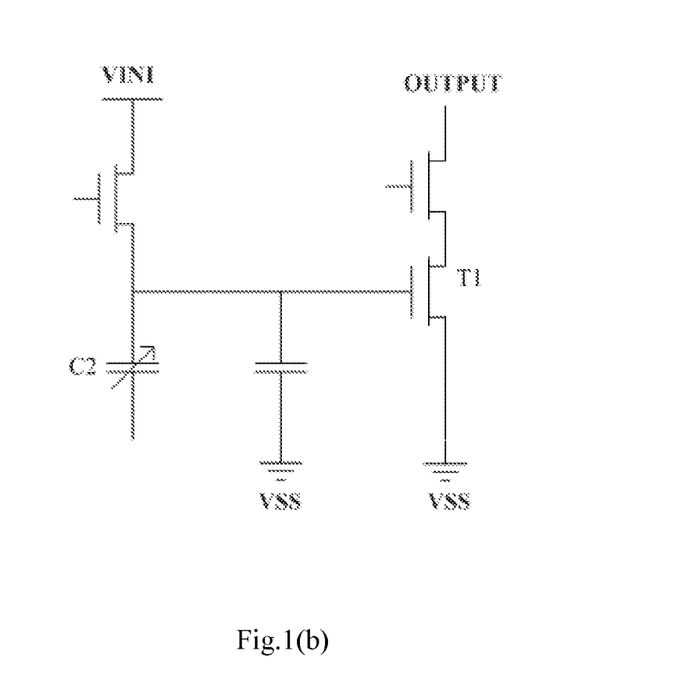

FIGS. 1(a) and 1(b) show a basic light-induced TSP in Cell circuit in the prior art. In FIG. 1(a), a sensor senses the light by means of a photodiode D1 and generates an electric leakage so as to detect a touch signal. In FIG. 1(b), the sensor senses the light by means of an induction capacitor C2, and detects a touch signal depending on the coupling of the induction capacitor and a variation of the capacitance. A TFT (Thin-Film Transistor) T1, as an amplifying transistor, is configured to amplify a voltage change cross D1 after detecting the touch signal, and enhance the output driving capability of the TSP in Cell circuit, so as to enable a readout circuit of the external TSP to read out a detection result correctly.

Figure 2:
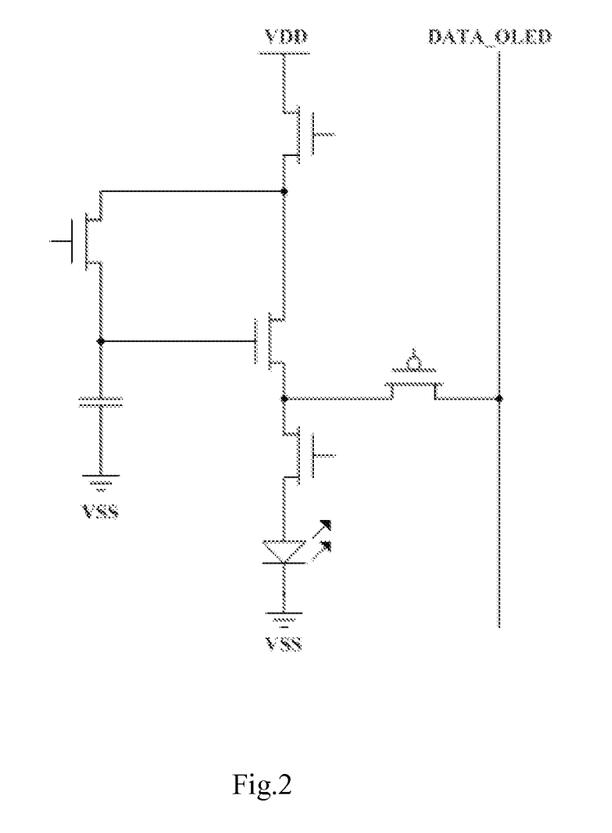
FIG. 2 is a schematic diagram showing an existing AMOLED pixel unit circuit.

As compared with a traditional liquid crystal panel, an AMOLED (Active Matrix Organic Light Emitting Diode) has advantages of a rapider response speed, higher contrast and a wider angle of view. Pixels of the AMOLED are driven by a relevant driving circuit on the array substrate so as to emit light and display. FIG. 2 shows an example of an AMOLED pixel unit circuit.

If the TSP in Cell circuit as shown in FIG. 1(a) or FIG. 1(b) is simply integrated into the AMOLED pixel unit circuit as shown in FIG. 2, three TFTs and one capacitor, apart from the existing five TFTs and two capacitors, are required to be added. In addition, three control signals, apart from the existing three control signals and two power sources, are also required to be added to control signal lines. However, there is no enough room for the pixels of AMOLED to accommodate these additional TFTs and signal lines. As a result, it is unable to integrate the TSP in Cell circuit into the AMOLED pixel unit circuit in the prior art.

SUMMARY

An embodiment of the present invention provides an AMOLED pixel unit circuit, a display panel and an electronic product, so as to integrate a TSP in Cell circuit into the AMOLED pixel unit circuit, and to manufacture the AMOLED display panel having a touch screen function and the electronic product having the display panel.

In one aspect, an embodiment of the present invention provides an AMOLED pixel unit circuit, comprising a light emitting module, a driving module, a threshold compensating module, a light-emission controlling module, a touch sensing module, and an induction signal outputting module, wherein the driving module is configured to amplify an induction signal generated by the touch sensing module, output the induction signal through the induction signal outputting module, and drive the light emitting module;

the light emission controlling module is configured to control the light emitting module to emit light;

the threshold compensating module is configured to compensate a threshold voltage for the driving module;

the touch sensing module is configured to generate the induction signal and output the induction signal to the driving module; and the induction signal outputting module is configured to output the induction signal amplified by the driving module.

In another aspect, an embodiment of the present invention provides a display panel comprising the AMOLED pixel unit circuit.

In yet another aspect, an embodiment of the present invention provides an electronic product comprising the display panel.

According to the above technical solutions, few circuit elements are newly added into an existing AMOLED pixel unit circuit, and the TSP in Cell circuit may be integrated into the AMOLED pixel unit circuit using common data lines, circuit elements and control signals and so on.

DETAILED DESCRIPTION

An embodiment of the present invention provides an AMOLED pixel unit circuit, a display panel and an electronic product, so as to integrate a TSP in Cell circuit into the AMOLED pixel unit circuit, and to manufacture the AMOLED display panel having a touch screen function and the electronic product having the display panel.

Figure 3:
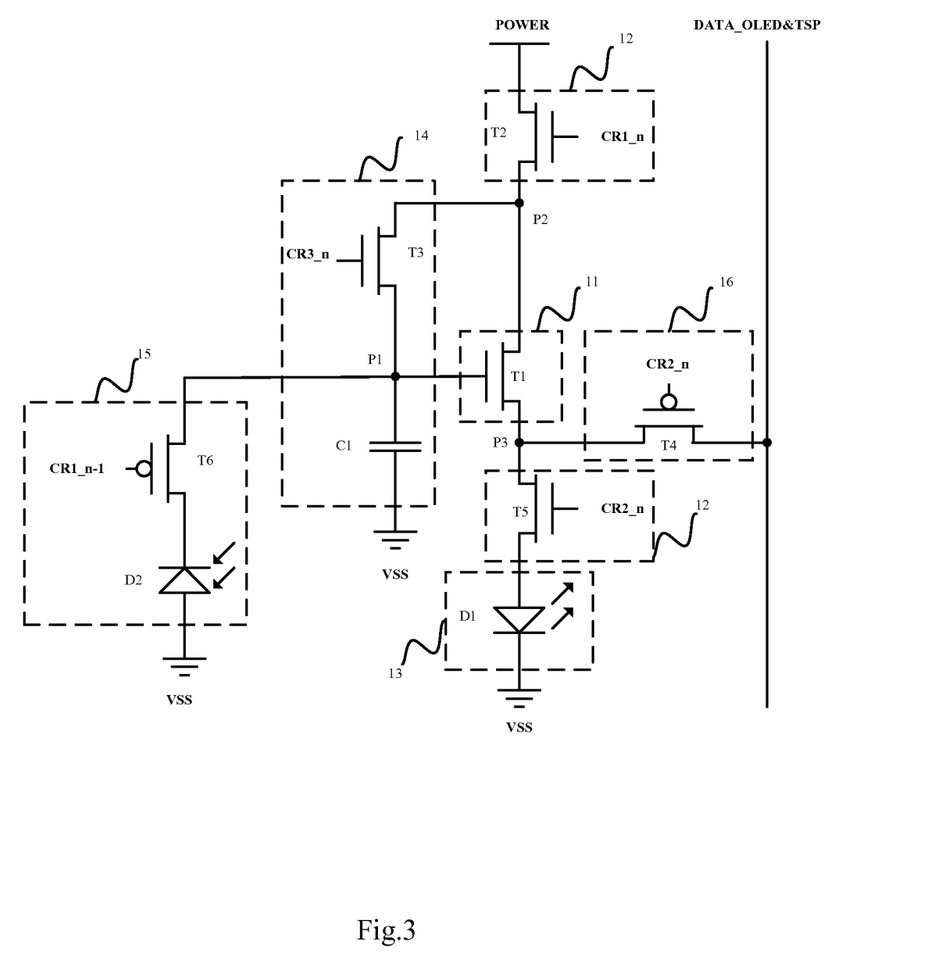
FIG. 3 is a schematic diagram showing an AMOLED pixel unit circuit according to one embodiment of the present invention.

Referring to FIG. 3, the AMOLED pixel unit circuit provided by an embodiment of the present invention comprises a light emitting module 13, a driving module 11, a threshold compensating module 14, a light emission controlling module 12, a touch sensing module 15, and an induction signal outputting module 16.

The driving module 11 is configured to amplify an induction signal generated by the touch sensing module 15, output the induction signal via the induction signal outputting module 16, and drive the light emitting module 13.

The light emission control module 12 is configured to control the light emitting module 13 to emit light.

The threshold compensating module 14 is configured to compensate a threshold voltage for the driving module 11.

The touch sensing module 15 is configured to generate the induction signal and output it to the driving module 11.

The induction signal outputting module 16 is configured to output the induction signal amplified by the driving module 11.

Preferably, the driving module 11 comprises a first transistor T1, a gate electrode of the first transistor T1 is coupled to a first node P1 of the circuit, and the other two electrodes of the first transistor T1 are coupled to a second node P2 and a third node p3 of the circuit, respectively.

Preferably, the light emission controlling module 12 comprises a second transistor T2 and a fifth transistor T5. A gate electrode of the second transistor T2 is coupled to a first control signal line of the AMOLED pixel unit circuit at the same stage (corresponding to a first control signal CR1_n of the AMOLED pixel unit circuit at the same stage), and the other two electrodes are coupled to a power line (corresponding to a power source POWER) and the second node P2 of the circuit, respectively. A gate electrode of the fifth transistor T5 is coupled to a second control line of the AMOLED pixel unit circuit at the same stage (corresponding to a second control signal CR2_n of the AMOLED pixel unit circuit at the same stage), and the other two electrodes are coupled to the third node P3 of the circuit and the light emitting module 13, respectively.

Preferably, the light emitting module 13 comprises a first LED D1, one end of D1 is coupled to the fifth transistor T5 and the other end of D1 is coupled to a low-voltage level signal line (corresponding to a low-voltage level signal VSS).

Preferably, the threshold compensating module 14 comprises a third transistor T3 and a first capacitor C1.

A gate electrode of the third transistor T3 is coupled to a third control signal line of the AMOLED pixel unit circuit at the same stage (corresponding to a third control signal CR3_n of the AMOLED pixel unit circuit at the same stage), and the other two electrodes are coupled to the second node P2 and the first node P1, respectively. The first capacitor C1 is coupled between the first node P1 and the low-voltage level signal line (corresponding to the low-voltage level signal VSS).

Preferably, the touch sensing module 15 comprises a sixth transistor T6 and a second LED D2. A gate electrode of the sixth transistor T6 is coupled to a first control signal line of an AMOLED pixel unit circuit at the previous stage (corresponding to a first control signal CR1_n-1 of the AMOLED pixel unit circuit at the previous stage), and the other two electrodes are coupled to the second LED D2 and the first node P1, respectively. One end of the second LED D2 is coupled to the sixth transistor T6, and the other end is coupled to the low-voltage level signal line (corresponding to the low-voltage level signal VSS).

Figure 4:
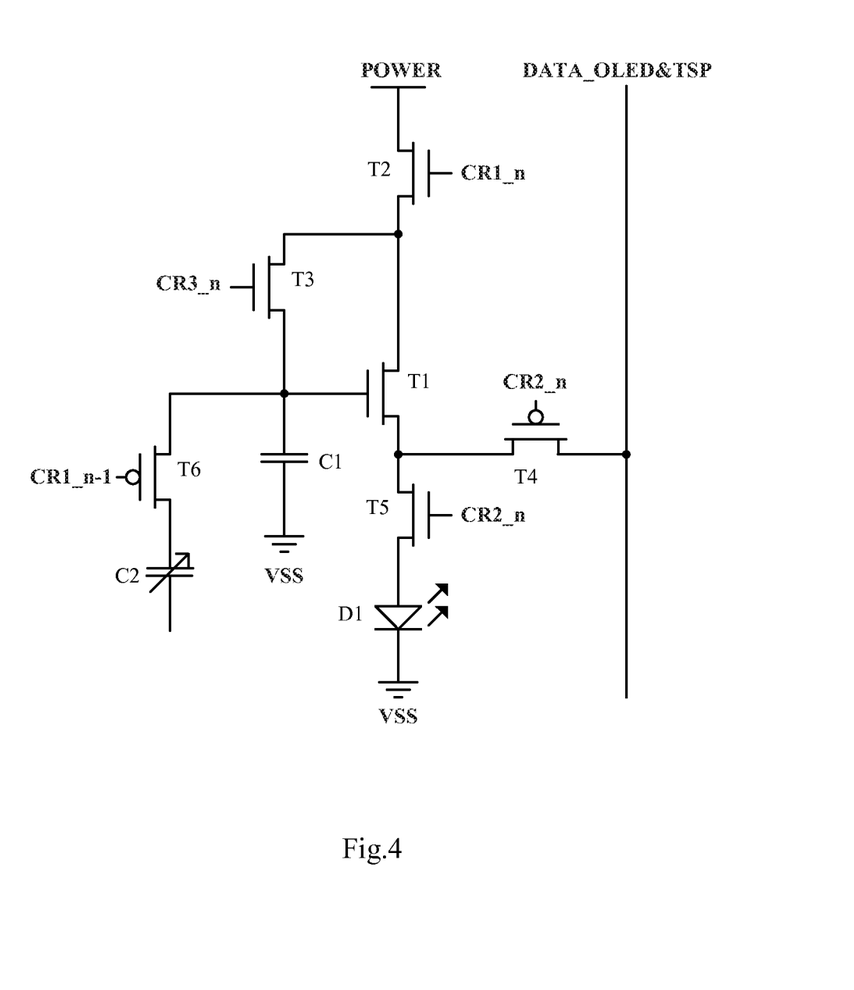
FIG. 4 is a schematic diagram showing the AMOLED pixel unit circuit according to another embodiment of the present invention.

Referring to FIG. 4, the touch sensing module 15 comprises the sixth transistor T6 and an induction capacitor C2. The gate electrode of the sixth transistor T6 is coupled to the first control signal line of the AMOLED pixel unit circuit at the previous stage (corresponding to the first control signal CR1_n-1 of the AMOLED pixel unit circuit at the previous stage), and the other two electrodes are coupled to the induction capacitor C2 and the first node P1, respectively. One end of the induction capacitor C2 is coupled to the sixth transistor T6, and the other end is required to be in contact with the outside, e.g., a human body, so as to change a voltage of the first capacitor C1 depending on the coupling of the induction capacitor and a variation of the capacitance.

When the sixth transistor T6 is turned on, an induction current is generated by the induction element D2 or C2, inputted into the first transistor T1 and amplified by the first transistor T1, and then outputted to a data line via the induction signal outputting module 16.

The touch sensing module 15 further uses the capacitor C1 as a storage capacitor, and uses the power line to input the levels desired for the TSP in cell circuit and the AMOLED circuit alternately.

In the present invention, the induction element may be of two types, e.g., a photodiode as shown in FIG. 3, or an induction capacitor as shown in FIG. 4.

Preferably, the induction signal outputting module 16 comprises a fourth transistor T4, a gate electrode of the fourth transistor T4 is coupled to the second control signal line of the AMOLED pixel unit circuit at the same stage (corresponding to the second control signal CR2_n of the AMOLED pixel unit circuit at the same stage), and the other two electrodes are coupled to the data line (corresponding to a data signal DATA_OLED&TSP) and the third node P3, respectively.

Preferably, an anode of the second LED D2 is coupled to the low-voltage level signal line (corresponding to the low-voltage level signal VSS), and a cathode thereof is coupled to the sixth transistor T6.

Preferably, an anode of the first LED D1 is coupled to the fifth transistor T5, and a cathode thereof is coupled to the low-voltage level signal line (corresponding to the low-voltage level signal VSS).

Preferably, the first transistor T1, the second transistor T2, the third transistor T3 and the fifth transistor T5 are N-type TFTs, while the fourth transistor T4 and the sixth transistor T6 are P-type TFTs.

In an embodiment of the present invention, a value of the third control signal VSS remains unchanged, e.g., it may be a cut-off level of the N-type TFT.

In this embodiment, CR1_n-1 refers to the first control signal CR1_n-1 inputted by the first control signal line of the AMOLED pixel unit circuit at the same stage of a previous row of pixel units corresponding to the current pixel units.

The operating principle of the circuit of an embodiment of the present invention is described hereinafter in conjunction with FIGS. 3, 5 and 6.

Figure 5:
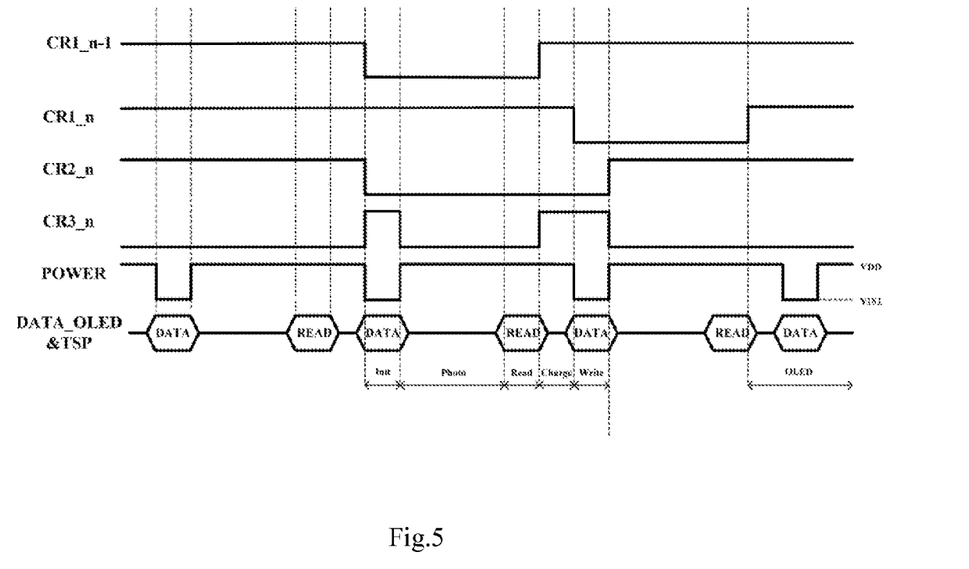
FIG. 5 is a time sequence diagram of control signals for the AMOLED pixel unit circuit according to an embodiment of the present invention.
Figure 6:
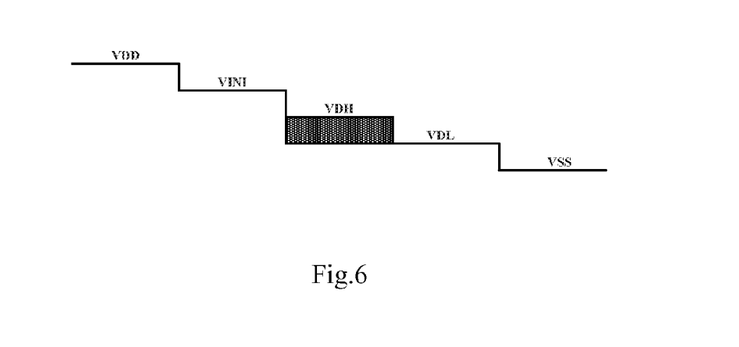
FIG. 6 is a diagram showing the level size of the control signals for the AMOLED pixel unit circuit according to an embodiment of the present invention.

FIG. 5 shows the time sequences of the control signals for the circuit according to an embodiment of the present invention. The operation of the circuit includes six phases, i.e., an initialization phase (Init), a photosensing phase (Photo), a reading phase (Read), a charging phase (Charge), a writing phase (Write), and an OLED phase. $V_{DATA}$ in FIG. 5 represents a grey-scale voltage of the data line DATA_OLED&TSP, with a value range of [VDL, VDH]. The LED D1 has different brightness at different grey-scale voltages. FIG. 6 shows the level size of the control signals in FIG. 5, where VSS<VDL<VDH<VINI<VDD. The values of the levels are all preset, and they may be set in accordance with the practical needs. Followings are the descriptions on the six phases.

In the Init phase, the transistor T6 is turned on, the photodiode D2 which serves as the TSP sensor is coupled to the gate electrode of the transistor T1 which serves as the amplifying TFT. C1 is used as a storage capacitor for the transistor T1. The transistors T2-T4 are turned on, and the level of the power line POWER is VINI. The TSP in cell circuit is initialized, i.e., the storage capacitor of the gate electrode of the amplifying transistor T1 is pre-charged to the initialized level VINI, so as to ensure the transistor T1 to be in a saturated and amplified state in the subsequent phases.

In the Photo phase, the transistor T3 is turned off, and the photodiode D2 detects a touch state of the panel. When the panel is touched by a finger, the light from an external light source cannot reach the photodiode D2, so the photodiode D2 accepts less light and the light-induced leakage current is small. As a result, in the Photo phase, the change of the voltage level of the capacitor C1 caused by the electric leakage is smaller. When the panel is not touched by the finger, the light from the external light source may reach the photodiode D2, so the photodiode D2 accepts more light and the light-induced leakage current is large. As a result, in the Photo phase, the change of the voltage level of the capacitor C1 caused by the electric leakage is larger. If the panel is touched, a voltage of the gate electrode of the transistor T1 varies slightly relative to the initial voltage, and if it is not touched, the voltage of the gate electrode of the transistor T1 varies greatly relative to the initial voltage.

In the Read phase, a result obtained in the Photo phase is stored in the capacitor C1. At this time, the transistor T3 is kept in an turned off state, and the transistor T4 is turned on. The data line DATA_OLED&TSP is used as a readout line for an output voltage of the TSP in cell circuit. The transistor T1 amplifies the voltage of its gate electrode and outputs it to the readout line, so as to output the amplified voltage to a peripheral TSP reading circuit.

In the above three phases, the TSP in Cell circuit is operating, so it can sense a touch from outside and outputs the induction signal. Because the transistor T5 is kept in an off state, in the above three phases the LED D1 will not emit light under the effect of the current caused when the transistor T2 is turned on. After the operation of the TSP in Cell circuit is completed, the transistor T6 is kept in an offstate, and the photodiode D2 is decoupled from the gate electrode of the transistor T1, so the circuit goes into a phase where the AMOLED circuit is operating.

In the Charge phase, the transistor T5 is turned off, the transistors T2, T3 and T4 are turned on, and the storage capacitor C1 is charged. A level of the gate electrode of the transistor T1 is VDD. The transistor T1 may be considered as a diode, and goes into a saturation state.

In the Write phase, the transistors T2, T5 are turned off, and the transistors T3, T4 are turned on. At this time, the data line DATA_OLED&TSP is used as an input for an AMOLED data signal. The data line DATA_OLED&TSP inputs the voltage $V_{DATA}$, i.e., a level of the source electrode of the transistor T1 is $V_{DATA}$. The capacitor C1 begins to discharge through the transistors T1, T3, T4, until the level of the gate electrode of the transistor T1 is $V_{TH}+V_{DATA}$, and a gate-to-source voltage VGS of the transistor T1 reaches at the threshold voltage $V_{TH}$ of the transistor T1.

In the OLED phase, the transistors T3, T4 are turned off, the transistors T2, T5 are turned on, and the OLED begins to emit light. The level of the source electrode of the transistor T1 is equal to the threshold voltage $V_{TH_{OLED}}$ of the LED D1 plus VSS. At this time, the current flowing through the OLED is:

$$I_{T1} = \frac{k}{2} \cdot [V_{TH} \cdot V_{DATA} - V_{TH_{OLED}} - V_{TH} - VSS]^2$$

$$= \frac{k}{2} \cdot [V_{DATA} - V_{TH_{OLED}} - VSS]^2,$$

wherein the value range of $V_{DATA}$ is from VDL to VDH.

The present invention further provides a display panel comprising the AMOLED pixel unit circuit.

The present invention further provides an electronic product comprising the display panel.

In a word, by redesigning the time sequences of the control signals and the voltage level values thereof, few circuit elements are newly added in the existing AMOLED pixel unit circuit, and it is able to integrate the TSP in Cell circuit into the AMOLED pixel unit circuit by sharing the data line, the circuit elements and the control signals.

Obviously, a person skilled in the art may make further modifications and improvements without departing from the spirit of the present invention. If these modifications and improvements fall within the scope of the appended claims and the equivalents thereof, the present invention is also intended to include these modifications and improvements.

What is claimed is:

1. An Active Matrix Organic Light Emitting Diode (AMOLED) pixel unit circuit, comprising a light emitting module, a driving module, a threshold compensating module, a light emission controlling module, a touch sensing module and an induction signal outputting module, wherein the driving module is configured to amplify an induction signal generated by the touch sensing module, output the induction signal through the induction signal outputting module, and drive the light emitting module;

the light emission controlling module is configured to control the light emitting module to emit light;

the threshold compensating module is configured to compensate a threshold voltage for the driving module;

the touch sensing module is configured to generate the induction signal and output the induction signal to the driving module; and the induction signal outputting module is configured to output the induction signal amplified by the driving module;

wherein the driving module comprises a first transistor, a gate electrode of which is coupled to a first node of the circuit, and the other two electrodes of which are coupled to a second node and a third node of the circuit, respectively, wherein the first node is a connection point between the driving module and the threshold compensating module, the second node is a common connection point among the driving module, the light emission controlling module, and the threshold compensating module, and the third node is a common connection point among the driving module, the light emission controlling module and the induction signal outputting module;

wherein the light emission controlling module comprises a second transistor and a fifth transistor, wherein a gate electrode of the second transistor is coupled to a first control signal line of the AMOLED pixel unit circuit at the same stage, and the other two electrodes are coupled to a power line and the second node of the circuit, respectively, and wherein a gate electrode of the fifth transistor is coupled to a second control line of the AMOLED pixel unit circuit at the same stage, and the other two electrodes are coupled to the third node of the circuit and the light emitting module, respectively;

wherein the light emitting module comprises a first LED, one end of which is coupled to the fifth transistor and the other end of which is coupled to a low voltage level signal line;

wherein the threshold compensating module comprises a third transistor and a first capacitor, wherein a gate electrode of the third transistor is coupled to a third control signal line of the AMOLED pixel unit circuit at the same stage, and the other two electrodes are coupled to the second node and the first node, respectively, and wherein the first capacitor is coupled between the first node and the low voltage level signal line; and wherein the touch sensing module comprises a sixth transistor and a second LED, a gate electrode of the sixth transistor is coupled to a first control signal line of an AMOLED pixel unit circuit at the previous stage, the other two electrodes are coupled to the second LED and the first node, respectively, one end of the second LED is coupled to the sixth transistor, and the other end is coupled to the low voltage level signal line; or the touch sensing module comprises the sixth transistor and an induction capacitor, the gate electrode of the sixth transistor is coupled to the first control signal line the AMOLED pixel unit circuit at the previous stage, the other two electrodes are coupled to the induction capacitor and the first node, respectively, one end of the induction capacitor is coupled to the sixth transistor, and the other end detects a touch signal.

2. The circuit according to claim 1, wherein the induction signal outputting module comprises a fourth transistor, a gate electrode of which is coupled to the second control signal line of the AMOLED pixel unit circuit at the same stage, and the other two electrodes of which are coupled to a data line and the third node, respectively.

3. The circuit according to claim 1, wherein an anode of the second LED is coupled to the low voltage level signal line, and a cathode thereof is coupled to the sixth transistor.

4. The circuit according to claim 2, wherein the first transistor, the second transistor, the third transistor and the fifth transistor are N-type thin film transistors, while the fourth transistor and the sixth transistor are P-type thin film transistors.

5. The circuit according to claim 2, wherein a gray-scale voltage of the data line is within a range of VDL to VDH, and VDL<VDH< an initialized level.

6. The circuit according to claim 1, wherein a voltage of the low voltage level signal line is VSS, and VSS<VDL.

7. The circuit according to claim 3, wherein a voltage of the low voltage level signal is VSS, and VSS<VDL.

8. An Active Matrix Organic Light Emitting Diode (AMOLED) pixel unit circuit, comprising a light emitting module, a driving module, a threshold compensating module, a light emission controlling module, a touch sensing module and an induction signal outputting module, wherein the driving module is configured to amplify an induction signal generated by the touch sensing module, output the induction signal through the induction signal outputting module, and drive the light emitting module;

the light emission controlling module is configured to control the light emitting module to emit light;

the threshold compensating module is configured to compensate a threshold voltage for the driving module;

the touch sensing module is configured to generate the induction signal and output the induction signal to the driving module; and the induction signal outputting module is configured to output the induction signal amplified by the driving module;

wherein the driving module comprises a first transistor, a gate electrode of which is coupled to a first node of the circuit, and the other two electrodes of which are coupled to a second node and a third node of the circuit, respectively, wherein the first node is a connection point between the driving module and the threshold compensating module, the second node is a common connection point among the driving module, the light emission controlling module, and the threshold compensating module, and the third node is a common connection point among the driving module, the light emission controlling module and the induction signal outputting module;

wherein the touch sensing module comprises a sixth transistor and a second LED, a gate electrode of the sixth transistor is coupled to a first control signal line of an AMOLED pixel unit circuit at the previous stage, the other two electrodes are coupled to the second LED and the first node, respectively, one end of the second LED is coupled to the sixth transistor, and the other end is coupled to a low voltage level signal line; or the touch sensing module comprises the sixth transistor and an induction capacitor, the gate electrode of the sixth transistor is coupled to the first control signal line the AMOLED pixel unit circuit at the previous stage, the other two electrodes are coupled to the induction capacitor and the first node, respectively, one end of the induction capacitor is coupled to the sixth transistor, and the other end detects a touch signal.

9. The circuit according to claim 8, wherein the induction signal outputting module comprises a fourth transistor, a gate electrode of which is coupled to a second control signal line of the AMOLED pixel unit circuit at the same stage, and the other two electrodes of which are coupled to a data line and the third node, respectively.

10. The circuit according to claim 8, wherein an anode of the second LED is coupled to the low voltage level signal line, and a cathode thereof is coupled to the sixth transistor.

* * * * *